US007700914B2

(12) United States Patent
Yoshimura et al.

(10) Patent No.: US 7,700,914 B2
(45) Date of Patent: Apr. 20, 2010

(54) SUBSTRATE FOR MASS SPECTROMETRY, MASS SPECTROMETRY, AND MASS SPECTROMETER

(75) Inventors: Kimihiro Yoshimura, Yokohama (JP); Kazuya Miyazaki, Tokyo (JP); Kazuhiro Yamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 12/133,654

(22) Filed: Jun. 5, 2008

(65) Prior Publication Data

US 2009/0045332 A1 Feb. 19, 2009

(30) Foreign Application Priority Data

Jun. 19, 2007 (JP) ............................ 2007-161803

(51) Int. Cl.
*H01J 49/00* (2006.01)
*B01D 59/44* (2006.01)

(52) U.S. Cl. ....................... 250/288; 250/281; 250/287; 438/85; 438/104; 438/409

(58) Field of Classification Search ................. 250/288, 250/281, 287; 438/85, 104, 409
See application file for complete search history.

(56) References Cited

U.S. PATENT DOCUMENTS 6,288,390 B1 * 9/2001 Siuzdak et al. .............. 250/288
7,354,996 B2 4/2008 Matsuo et al.
2004/0058059 A1 * 3/2004 Linford et al. ................ 427/58
2005/0224710 A1 10/2005 Matsuo et al.
2006/0243899 A1 11/2006 Matsuo et al.
2007/0212591 A1 9/2007 Miyazaki et al.
2009/0232867 A1 * 9/2009 Domb et al. ................ 424/423

FOREIGN PATENT DOCUMENTS

JP 62-043562 A 2/1987
JP 10-182704 A 7/1998
JP 2005-326391 A 11/2005
JP 2006-049278 A 2/2006

* cited by examiner

*Primary Examiner*—Nikita Wells
(74) *Attorney, Agent, or Firm*—Fitzpatrick, Cella, Harper & Scinto

(57) ABSTRACT

Provided is a substrate for mass spectrometry, which enables a detection of a high molecular weight compound to be conducted at a high sensitivity, and can avoid the fragmentation so that there is substantially no obstacle to the analysis of a low molecular weight region. The substrate is a substrate for mass spectrometry for use in laser desorption/ionization mass spectrometry, containing a metal and having a porous structure on a surface thereof, wherein at least one functional group selected from the group consisting of a carboxyl group, a sulfonic group and an ammonium chloride group is covalently bonded to the surface of the substrate.

11 Claims, 3 Drawing Sheets

SUBSTRATE FOR MASS SPECTROMETRY, MASS SPECTROMETRY, AND MASS SPECTROMETER

BACKGROUND OF THE INVENTION

1. Field of the Invention

The present invention relates to a substrate for mass spectrometry, a mass spectrometry, and a mass spectrometer. In particular, the present invention relates to a sample support substrate for mass spectrometry capable of subjecting high molecular weight analyte molecules for mass spectrometry to desorption/ionization, and capable of performing mass spectrometry easily at a high precision with less generation of complicated peaks derived from a decomposed substance and the like even in a low molecular weight region, a mass spectrometry using the substrate for mass spectrometry, and a mass spectrometer.

2. Description of the Related Art

A mass spectrometer ionizes analyte molecules by some method, applies an electric field or a magnetic field to the ionized molecules to separate the analyte molecules in accordance with a mass/charge-number (m/z), and thereafter, performs a qualitative analysis and a quantitative analysis of the analyte from a mass spectrum detected electrically. In this case, as the ionization method, there are various kinds of methods such as electronic spray ionization (ESI), electron impact ionization (EI), chemical ionization (CI), fast atom bombardment (FAB), field desorption (FD), laser desorption ionization (LDI), and matrix-assisted laser desorption ionization (MALDI). For example, in the laser ionization mass spectrometer, a sample is ionized by pulse laser light irradiation, and the ion is guided to a time-of-flight analysis portion or the like, whereby a mass spectrum and the like can be measured.

Conventionally, according to the LDI method, in a laser ionization mass spectrometer, a sample solution in which an analyte compound is dissolved in water or an organic solvent is first prepared. The sample solution is applied to a smooth surface of a metal holder, followed by drying, to form the sample into a thin film. When the sample thin film is irradiated with laser light, the laser light is absorbed by a metal sample support substrate, and the temperature increases rapidly at the irradiated portion, whereby the sample is ionized.

However, according to the above sample production method, there are problems in that a decomposition reaction (hereinafter, which may also be referred to as fragmentation) occurs simultaneously with the desorption/ionization of analyte molecules by laser light irradiation, the mass spectrum of the analyte molecules may not be obtained with a sufficient intensity, and the peak of the decomposed substance is also detected, which complicates the mass spectrum, with the result that the analysis thereof becomes difficult.

In order to solve the above problems, according to the MALDI method using, as a matrix, a mixture containing a liquid with high viscosity and low vapor pressure such as glycerin and metal fine particles (Japanese Patent Application Laid-Open No. S62-043562) or solid organic molecules such as 2,5-dihydroxybenzoic acid (DHB), sinapinic acid, and α-cyano-hydroxy-cinnamic acid (CHCA) (Japanese Patent Application Laid-Open No. H10-182704 and Japanese Patent Application Laid-Open No. 2005-326391), the matrix is desorbed/ionized by absorbing energy of irradiation laser light, and the influence of the irradiation laser light on the analyte molecules contained in the matrix is alleviated, whereby the fragmentation of the analyte molecules is suppressed, and the detection at high sensitivity can be performed. Due to the advancement of the MALDI method, even a slight amount of the analyte compound with a high molecular weight, which has not been dealt with by conventional mass spectrometry, can be measured. Thus, the MALDI method has become used widely in the analysis of a biological material and a synthetic polymer.

However, according to the MALDI method, although the decomposed substance of the analyte molecules can be suppressed considerably, a number of peaks derived from a complicated reaction occurring when the matrix itself absorbs laser light are detected, and the spectrum analysis in a low molecular weight region is still difficult in most cases. In particular, in the recent proteomix and metabolomix fields, the necessity of collectively analyzing compounds contained in blood, body fluid, and the like, as well as single molecular species, is increasing. In the case of the collective analysis, the analysis of a compound with a relatively low molecular weight with a mass number of about several hundreds, such as a substrate and a metabolite, provides important information. However, according to the conventional MALDI method, the following problem has arose: the analysis in a low molecular range cannot be performed with good precision due to the complicated peak derived from the matrix. Further, in the field of a synthetic polymer material, additives with a molecular weight of about several hundred, such as an antioxidant, a UV-absorber, and a plasticizer, are generally contained in a molded product of a polymer material, and it is also necessary to analyze the polymer material and a low molecular weight compound at a time. Thus, the complicated peak derived from the matrix in the MALDI method is an obstacle in the same way as in the collective analysis in biochemistry.

Further, in the case of analyzing a high molecular weight compound by the MALDI method, by changing measuring conditions such as intensity of irradiation laser light, for example, the fragmentation of an analyte compound can be performed actively in some cases. By analyzing fragment ions generated herein, information on the molecular structure of the analyte compound such as a substituent and a side-chain structure can also be obtained in addition to the mere analysis of a molecular weight. However, in the case where there are a number of complicated peaks derived from a matrix, the complicated peaks become a serious obstacle also in the analysis of a fragment ion from the analyte compound.

As a technology capable of performing mass analysis of the low molecular weight region simultaneously, a method of allowing analyte molecules to adhere directly to a sample support substrate having a fine porous structure on a surface thereof such as a porous silicon substrate formed by electrolytic etching, and irradiating the analyte molecules with laser light, thereby performing desorption/ionization of the analyte molecules without allowing complicated peaks derived from a matrix to appear (SALDI: surface-assisted laser desorption/ionization) is proposed (U.S. Pat. No. 6,288,390). Owing to this method, both of the efficient desorption/ionization, and the suppression of generation of a decomposed substance during the laser light irradiation can be performed. However, the upper limit of the molecular weight of the analyte compound is about several thousands, and the desorption/ionization of a compound with a molecular weight of more than several thousands is considered to be difficult.

Thus, in mass spectrometry by the desorption/ionization with the laser light irradiation it is difficult to detect collectively a low molecular weight region to a high molecular weight region at a time, and analysis in a wide molecular weight region cannot be performed.

SUMMARY OF THE INVENTION

The present invention has been achieved in view of the above background art, and the object is to provide a substrate for mass spectrometry in which the detection of a high molecular weight compound by desorption/ionization is performed at high sensitivity in mass spectrometry by the desorption/ionization with laser light irradiation, and the fragmentation can be avoided as much as possible so that there is substantially no obstacle to the analysis of a low molecular weight region.

Another object of the present invention is to provide a mass spectrometry and a mass spectrometer using the substrate for mass spectrometry.

A substrate for mass spectrometry for solving the above problem is a substrate for mass spectrometry, which is used for laser desorption/ionization mass spectrometry, containing a metal and having a porous structure on a surface thereof, wherein at least one functional group of a carboxyl group; a sulfonic group; and an ammonium chloride group is covalently bonded to the surface of the substrate.

A mass spectrometry for solving the above problems includes placing a sample on the substrate for mass spectrometry and irradiating the substrate with a laser.

A mass spectrometer for solving the above problems includes is provided with the substrate for mass spectrometry.

According to the present invention, a substrate for mass spectrometry can be provided with which the detection of a high molecular weight compound by desorption/ionization is performed at high sensitivity in mass spectrometry by the desorption/ionization with laser light irradiation, and the fragmentation can be avoided as much as possible so that there is substantially no obstacle to the analysis of a low molecular weight region.

Further, according to the present invention, a mass spectrometry and a mass spectrometer using the substrate for mass spectrometry can be provided.

Further features of the present invention will become apparent from the following description of exemplary embodiments with reference to the attached drawings.

DESCRIPTION OF THE EMBODIMENTS

Figure 1:
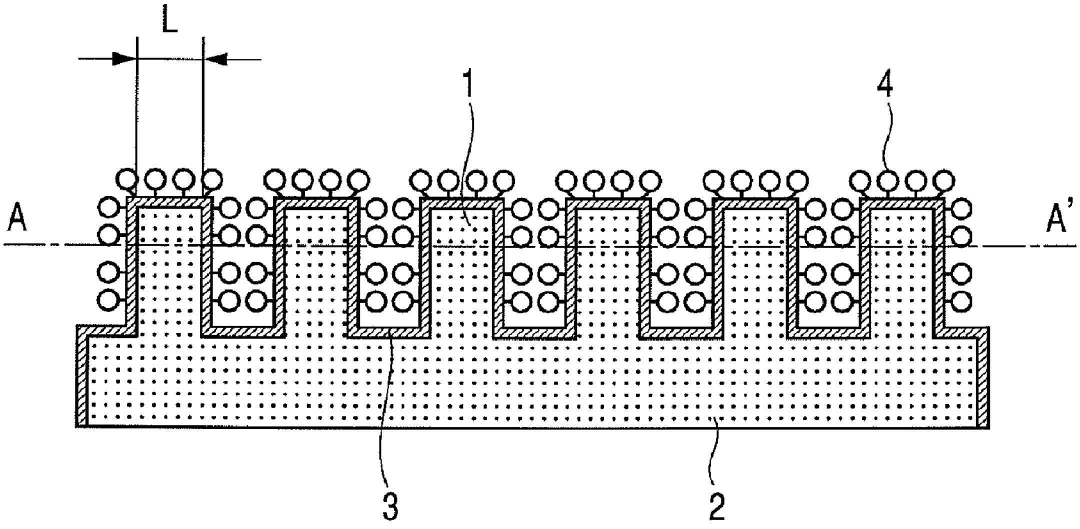
FIG. 1 is a schematic view illustrating one embodiment of a substrate for mass spectrometry of the present invention.

Hereinafter, the present invention will be described in detail.

The present invention relates to a substrate for mass spectrometry used in laser desorption/ionization mass spectrometry as a sample target substrate used in a laser desorption type mass spectrometer, and has a feature in that fragmentation can be avoided as much as possible so that there is substantially no obstacle to the analysis of a low molecular weight region by using a substrate in which at least one functional group of a carboxyl group, a sulfonic group, and an ammonium chloride group is covalently bonded to the surface of a substrate containing a metal and having a porous structure.

It is preferred that an oxide layer is formed on the surface of the substrate containing a metal and having a porous structure, and the oxide layer and at least one of a carboxyl group, a sulfonic group, and an ammonium chloride group are covalently bonded to each other.

The mass spectrometry of the present invention includes placing a sample on the substrate for mass spectrometry and irradiating the sample with a laser, and measuring the mass number of a analyte material, using a mass spectrometer having a matrix-assisted laser desorption/ionization (MALDI) ion source.

At present, the mechanisms of desorption/ionization in the MALDI method and fragmentation have not been completely clarified. In the specification of the present invention, the present invention will be described based on the interpretation of the mechanism mostly accepted currently.

The general measurement by the MALDI method will be described. A mixed crystal in which a slight amount of analyte molecules are contained in solid organic molecules, serving as matrix molecules, such as nitroanthracene (9NA)4,2,5-dihydroxybenzoic acid (DHB), sinapinic acid, and α-cyano-hydroxy-cinnamic acid (CHCA), is formed on a sample support substrate for analysis. At this time, it is preferred that analyte molecules are in a dilute state, and there is no interaction between analyte molecules. Then, the mixed crystal is irradiated with laser light, and the matrix molecules having absorbed the laser light are excited with electrons and/or excited with vibration to be vaporized. The matrix molecules are not only vaporized while keeping the structure of the molecules, but the vaporization thereof also includes light and heat reactions such as complicated decomposition and ionization. While the matrix molecules are vaporized, the analyte molecules in the crystal are also vaporized simultaneously. If the interaction between the analyte molecules is small, it is necessary that the analyte molecules be vaporized while being independent with each other. Most of the energy of the laser light is absorbed by the matrix molecules, so it is an ideal state that the fragmentation of the analyte molecules is not caused. Further, in order for the mass of the analyte molecules to be actually measured, the analyte molecules need to be ionized. As the ionization process, there are known: protonation (generation of cations by the addition of protons) and deprotonation (generation of anions by pulling out protons) from the matrix molecules; the addition of ions (addition of metal ions: generation of cations, addition of halogen ions: generation of anions) from ionization promoters such as radical cations (generation of cations by pulling out electrons), radical anions (generation of anions by providing electrons), and metal salts; and the like. Thus, according to the MALDI method, it is considered that the matrix molecules are deeply related to the processes of vaporization (desorption) and ionization of the analyte molecules, and allow the analyte molecules to be desorbed and ionized efficiently. In particular, the MALDI method can deal with even compounds having a molecular weight of tens of thousands or more as analyte molecules. The reason for this is considered that when the matrix molecules are vaporized, the matrix molecules and a decomposed substance thereof function as carriers for the analyte molecules. However, the matrix molecules and a decomposed substance thereof that are carriers are often ionized simultaneously, with the result that those compounds may appear as unwanted ones in a mass spectrum. Further, the reaction process of decomposing the matrix molecules is complicated, and influenced by various measurement parameters such as analyte molecules, an ionization promoter, a solvent used for preparing a sample, the intensity and wavelength of laser light, the polarity of analyte molecules, and the acceleration voltage of ions. Therefore, the peaks derived from the matrix molecules appearing in a mass spectrum are very complicated, and hence, it is impossible to substantially identify all the peaks.

The inventors of the present invention have studied earnestly, and consequently, found that if a compound that is decomposed to a mass number of less than 160, more preferably less than 50 is selected as a matrix, the matrix does not substantially become an obstacle as impurities even in the analysis of a mass spectrum. In a biochemical material using the MALDI method, examples of the compounds that may appear in a low molecular weight region include an essential amino acid having a mass number of about 120 to 200, a monosaccharide having a mass number of about 150 to 180, four bases constituting a DNA having a mass number of about 110 to 150, and a plasticizer and an antioxidant added to a synthetic polymer material having a mass number of 200 or more.

The inventors of the present invention found that fragmentation can be avoided as much as possible so that there is substantially no obstacle to the analysis of a low molecular weight region by using, as a substrate for mass spectrometry used for a laser desorption type mass spectrometer, a substrate in which at least one functional group of a carboxyl group, a sulfonic group, and an ammonium chloride group is covalently bonded to the surface of a substrate containing a metal and having a porous structure on a surface thereof.

FIG. 1 is a schematic view illustrating one embodiment of a substrate for mass spectrometry of the present invention. In FIG. 1, the substrate for mass spectrometry of the present invention is configured in such a manner that an oxide layer 3 is formed on a surface of a substrate 2 containing a metal and having a porous structure 1 on a surface thereof, and the oxide layer 3 is covalently bonded to at least one functional group 4 of a carboxyl group (—COOH), a sulfonic group (—$SO_3H$), and an ammonium chloride group (—$NH_3Cl$).

First, the substrate containing the metal and having the porous structure 1 (metal substrate) is described. As a method of producing the substrate containing the metal and having the porous structure 1, a method disclosed in, for example, Japanese Patent Application Laid-Open No. 2006-049278 can be used.

The substrate containing a metal is used, for its convenience in handling, for example. Hereinafter, the substrate containing a metal will be referred to as metal substrate.

The thickness of the porous structure is preferably 30 nm to 1,000 nm, and more preferably 50 nm to 500 nm. The mechanism of the porous structure with respect to the thickness is uncertain, but in the case where the thickness of the porous structure is smaller than 30 nm, it is considered that the ratio of the increase in specific surface area by the porous structuralization is small, and the substrate effect is reduced, and on the contrary, in the case where the thickness of the porous structure is larger than 1,000 nm, analyte molecules permeate the inside of the porous structure too much, which makes it difficult to cause desorption by laser irradiation.

Further, the porous structure can be checked by observing the cross-section of the substrate for mass spectrometry. The porous structure is preferably 20 nm to 200 nm, and more preferably 50 nm to 150 nm. A straight line (AA' line of FIG. 1) parallel to the surface of the substrate is drawn at a point of 20% from the surface in the thickness direction of the porous structure (for example, a point of 40 nm from the surface when the portion having a porous structure is 200 nm), and the length from the metal portion of a projected portion to a void portion is observed. At this time, the state where the proportion of the length L of the projected portion, in a direction parallel to the substrate surface, within a range of 20 nm to 200 nm is 70% or more means the porous structure of 20 nm to 200 nm in the present invention. Further, in the case of observing the porous structure by the above method, mass spectrometry can be performed with high sensitivity by setting the ratio of the area occupied by the projected portion to be 20% to 90%, preferably 30% to 80%, and more preferably 40% to 60% of the area of the entire surface, regarding the ratio of an area occupied by the metal portion of the projected portion and the void portion.

In the case where the substrate for mass spectrometry in which the porous structure is 20 nm to 200 nm is used, when a sample solution is placed on the substrate, the sample solution can be prevented from being diffused to spread due to the porous structure, whereby the decrease in a sample concentration per unit area can be prevented.

Figure 2:
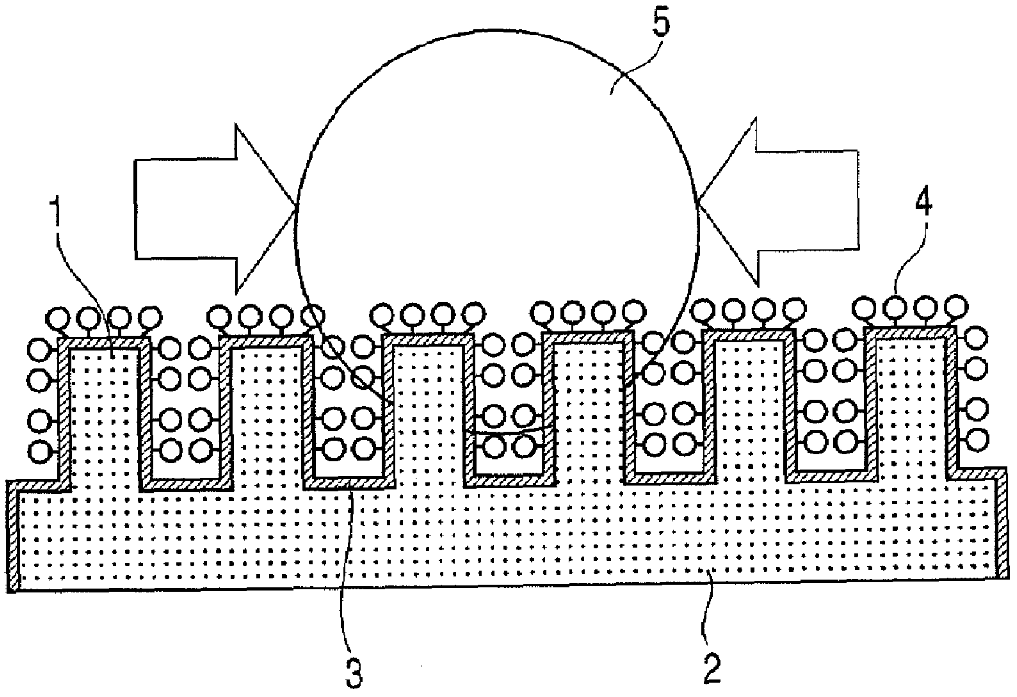
FIG. 2 is a schematic view illustrating the state in which a sample liquid is placed on a substrate for mass spectrometry having a porous structure on a surface thereof of the present invention.

FIG. 2 is a schematic view illustrating the state in which a sample solution is placed on a substrate for mass spectrometry having a porous structure on a surface thereof of the present invention. As shown in FIG. 2, when a sample solution 5 is placed on the substrate for mass spectrometry, the diffusion of the sample solution can be prevented by the porous structure 1. In the present invention, at least one functional group of a carboxyl group, a sulfonic group, and an ammonium chloride group is covalently bonded to the surface of the substrate, so the surface energy decreases, and liquid droplets of the sample solution spread, with the result that the concentration of the sample per unit area decreases. However, by setting the surface to be the porous structure as described above, the diffusion of the sample solution can be prevented.

Figure 3:
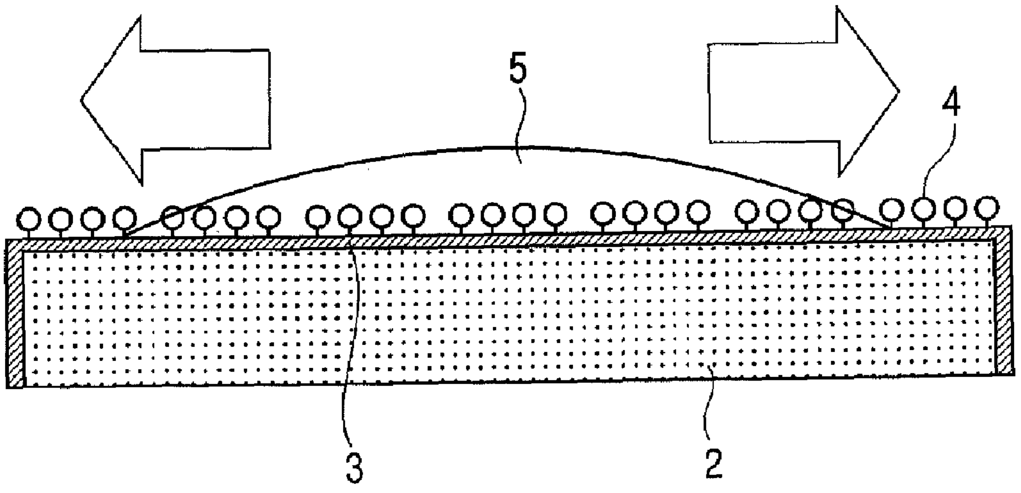
FIG. 3 is a schematic view illustrating the state in which a sample liquid is placed on a substrate for mass spectrometry having no porous structure on a surface thereof.

FIG. 3 is a schematic view illustrating the state in which a sample solution is placed on a substrate for mass spectrometry having no porous structure on a surface thereof. As shown in FIG. 3, when there is no porous structure in the substrate for mass spectrometry, the surface energy caused by a functional group of a carboxyl group, a sulfonic group, or an ammonium chloride group decreases, with the result that the sample solution 5 is diffused and the concentration of the sample decreases.

The reason why the substrate for mass spectrometry of the present invention in which at least one functional group selected from a carboxyl group, a sulfonic group, and an ammonium chloride group is covalently bonded to the surface of a metal substrate is effective for a laser desorption/ionization mass spectrometer is unknown. It may be considered as follows. Due to the increase in the specific surface area, measuring molecules adsorb to the substrate surface at a certain distance from each other, so they are likely to be desorbed. Further, protons and chlorine ions are added to the measuring molecules via the carboxyl group, sulfonic group, or ammonium chloride group on the substrate surface, which enhances ionization efficiency. In the case of desorbing/ionizing the measuring molecules by laser irradiation on the substrate surface without using a matrix, even if a porous substrate described in, for example, Japanese Patent Application Laid-Open No. 2006-049278 described above is used, it is considered that the desorption efficiency can be enhanced certainly. However, the ionization mostly depends upon the addition of cations or anion species, particularly in the case of a biological material such as a protein and a DNA. In a system using a matrix, ion species generated from the matrix by laser irradiation are added to the measuring molecules, ionization can be performed efficiently. However, in the case of not using a matrix, while it is necessary to generate a number of ion species to be added simultaneously for promoting ionization, an ion source needs to depend upon the decomposition of the measuring molecules. This means that the promotion of ionization promotes the destruction of the measuring molecules, and thus, it is necessarily limited to enhance sensitivity in microanalysis. By using the substrate of the present invention, the desorption/ionization of the measuring molecules can be promoted simultaneously without causing the unnecessary destruction of the measuring molecules.

Further, conventionally known matrix molecules such as 9-NA, DHB, and CHCA can also be mixed in the matrix of the present invention in such a range that an impurity peak does not cause an obstacle to the measurement and analysis.

The material for the metal substrate of the present invention needs to have high conductivity to some degree. In the case where measuring molecules are desorbed/ionized on a substrate surface by laser irradiation, at a moment when the measuring molecules become, for example, cations, those which have an opposite charge are supposed to be present in the vicinity of the cationized measuring molecules. The ion portion of a mass spectrometer is provided with an electric field, and the cation species are desorbed from the substrate surface by being attracted by the electric field. Thus, in order for the cation species to be desorbed, the cation species need to be separated from those which have an opposite charge present in the vicinity of the cation species. However, an electrostatic attraction works therebetween, so there is a possibility that recombination of charges may occur. When the recombination of charges occurs, the ionization of the measuring molecules is inhibited at that time. Thus, in order to promote the ionization, it is necessary to locate the charge having a polarity opposite to that of the ionized measuring molecules away from the ionized measuring molecules. Herein, the charge having an opposite polarity remain on the substrate without being desorbed by the electric field, so it is necessary to dissipate only the charge using the conductivity of the substrate in order to dissipate the charge having an opposite polarity. Therefore, it is preferred that a material for the substrate have high conductivity, and in particular, a metal be used. Further, in order to desorb/ionize the measuring molecules by laser irradiation without using a matrix as in the present invention, it is necessary that the substrate absorb laser energy to be ready to desorb/ionize the measuring molecules. The inventors of the present invention have earnestly studied, and consequently, found that, for particularly increasing the efficiency of desorption/ionization, a metal material merely having conductivity is not sufficient, and a particular metal is necessary. The inventors found that, particularly in the case where the irradiation laser is UV-rays having a wavelength of about 300 nm to 400 nm, platinum, silver, copper, stainless steel, and the like having a reflectance that is not so high are more preferred, compared with aluminum having a high reflectance in this wavelength range. Of those metals, gold and silver are desorbed/ionized as cations by UV-ray irradiation, so they influence a measurement spectrum. Thus, a platinum substrate, a copper substrate, and a stainless steel substrate are more preferred. Further, considering that properties of the metal change due to the erosion and oxidation of the surface thereof, platinum or stainless steel is most preferred.

In the present invention, a substrate for mass spectrometry is preferably used, in which the porous structure has pores in a substrate, or the porous structure is formed of a projected structure having projected portions on the surface of a substrate.

A method of forming a surface shape in which a surface porous structure is 20 nm to 200 nm on the metal substrates is described.

Figure 4:
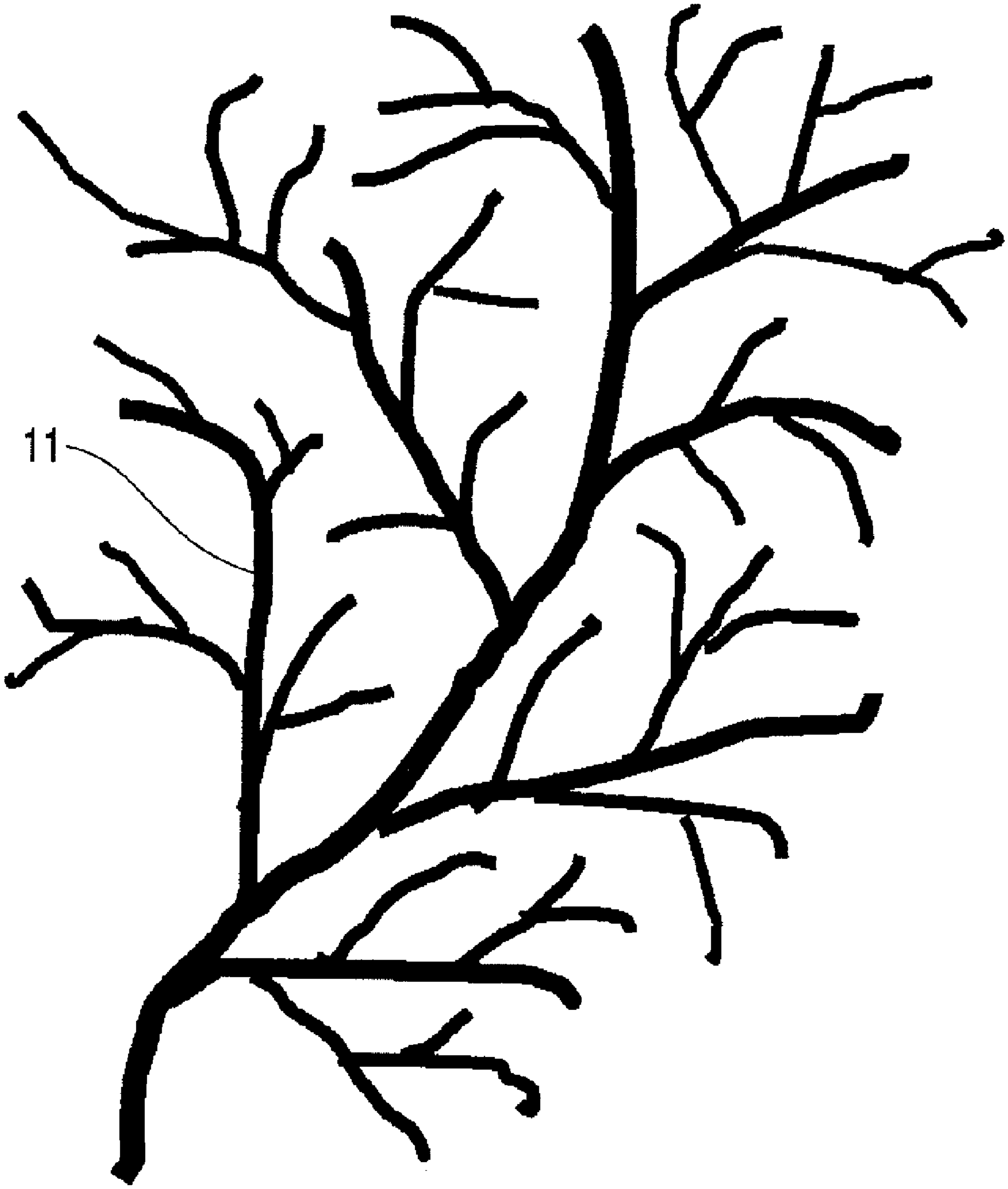
FIG. 4 is a schematic view illustrating a porous structure of a dendritic structure.

Examples of the porous structure include a fine nano-structure having pores called a porous substrate, a structure having rod-shaped projections, and complicated structures in a fiber shape or a dendritic. In the present invention, in order to allow the measuring molecules to adhere to a substrate surface while minimizing the aggregation thereof, and to be desorbed efficiently for each position during measurement, a porous structure 11 having a dendritic structure, which is more complicated than a projected shape, as in the schematic view shown in FIG. 4, for example, is preferred.

As a method of forming a metal substrate having such a surface porous structure, there are, for example, a method of subjecting a metal substrate to etching, and a method of depositing metal components on a surface by sputtering. Particularly in the case of a dendritic porous structure, it is preferred that the length of divided branches or chips as shown in Japanese Patent Application Laid-Open No. 2006-049278 in a cross direction be 5 nm to 200 nm.

It is preferred that the porous structure is formed of a dendritic structure formed of platinum or a multi-element metal containing platinum, obtained by subjecting a platinum oxide or a complex oxide to reduction treatment. Further, it is preferred that metal elements other than platinum include at least one metal selected from Al, Si, Ti, V, Cr, Fe, Co, Ni, Cu, Zn, Ge, Zr, Nb, Mo, Ru, Rh, Pd, Ag, In, Sn, Hf, Ta, W, Os, Ir, Au, La, Ce, and Nd.

Next, the modification of the surface with a carboxyl group, a sulfonic group, or an ammonium chloride group will be described. The measuring molecules can adhere to the substrate surface uniformly and the aggregation of the measuring molecules can be avoided due to the presence of a fine structure of the substrate surface, so the desorption efficiency of the measuring molecules can be enhanced. However, since the measuring molecules are detected as ions thereof in a mass spectrometer, it is also necessary to enhance the ionization efficiency. In the measurement using a matrix, protons are generated from matrix molecules by laser irradiation, and adhere to the measuring molecules to promote the ionization. On the other hand, in the measurement in a system without using a matrix, the ion source is a problem. The biological molecules such as a nucleic acid and a protein are mainly ionized by the addition of protons. It has been clarified from a detailed analysis that the measuring molecules are protonized even in the case of the measurement without using a matrix. This is considered that the protons generated when a part of the measuring molecules is destructed are added. Thus, the promotion of the ionization can also be considered as the promotion of the destruction of the measuring molecules, and there is a limit to the enhancement of sensitivity in microanalysis. The inventors of the present invention have earnestly studied, and consequently, found that the ionization efficiency can be promoted by using a substrate in which a compound having a carboxyl group, a sulfonic group, or an ammonium chloride group on a surface is covalently bonded to a substrate surface. The enhancement of the ionization efficiency can be expected to some degree merely by applying such a compound having a functional group to a substrate surface. However, the measurement of mass spectrometry is conducted generally under high vacuum, so the compound merely applied to the substrate surface may be evaporated, and further, may be desorbed/ionized during the measurement. Therefore, unnecessary peaks may be observed on a spectrum in the same way as in the case of using a matrix.

As a method of allowing a compound having a carboxyl group, a sulfonic group, or an ammonium chloride group to be covalently bonded to a substrate surface, there is a method of treating the surface of a substrate with a surface treatment agent having those functional groups, or treating the surface of a substrate with a surface treatment agent having a structure to be precursors of desired functional groups and thereafter, changing the functional groups to the desired functional groups by another chemical reaction. Further, in the case of a carboxyl group, it is also possible to treat the surface of a substrate with a surface treatment agent having an alkyl group and a fluorinated alkyl group followed by oxidization of the groups with an ozone treatment or the like to generate a carboxyl group. Further, in order to allow the surface of a substrate to have an ammonium chloride group, the surface is first treated with a compound having an amino group, and thereafter, the amino group is chemically treated to be converted into an ammonium group.

Examples of the surface treatment agents having functional groups include silane coupling agents such as 3-cyanopropyltriethoxysilane, 3-mercaptopropyltriethoxysilane, (heptadecafluoro-1,1,2,2-tetrahydroxydecyl)triethoxysilane, and 3-aminopropyltriethoxysilane.

In the case where it is difficult to directly allow the metal surface to have a covalent bond by surface treatment, a particular oxide coating film can also be provided on the metal surface. For example, in the case of a compound having high insulation, the physical properties of an oxide coating film is expected to cause a trouble to the separation of charges in the above ionization. Therefore, a coating film formed of a material such as titanium oxide ($TiO_2$), ruthenium oxide ($RuO_2$), tungsten oxide ($WO_3$), or nickel oxide ($NiO_2$) is preferred. Those oxide layers can be formed by a conventionally known method. For example, a $TiO_2$ layer can be formed using a sol-gel reaction of $Ti(O—C_3H_7)_4$, but the present invention is not limited to this method.

Next, the mass spectrometry of the present invention comprising placing a sample on the substrate for mass spectrometry and irradiating the sample with a laser.

It is preferred that when a sample is placed on the substrate for mass spectrometry and is irradiated with a laser in the mass spectrometry of the present invention, because a functional group of a carboxyl group, a sulfonic group, or an ammonium chloride group, which is an ion supply source, is excited to promote both the release and the ionization of measuring molecules.

The mass spectrometer of the present invention is provided with the substrate for mass spectrometry.

The substrate for mass spectrometry of the present invention enables the analyte molecules for mass spectrometry to be continuously desorbed/ionized efficiently. According to the desorption/ionization method of the present invention using the substrate for mass spectrometry, the analyte molecules for mass spectrometry can be ionized continuously under relatively mild conditions, and a sample can be prepared easily. Further, a noise derived from an ionization assistant during mass spectrometry can be reduced substantially, whereby the analysis precision can be enhanced. Therefore, a material having a wide range of molecular weights can be easily subjected to mass spectrometry with high precision, and in particular, partial structure analysis, molar distribution, molecular weight distribution, and the like of a low molecular weight compound can be performed easily, by using the ionization method.

EXAMPLES

Hereinafter, the present invention will be described by way of examples and comparative examples. It should be noted that the present invention is not limited to the following examples.

Substrate Material Example 1 Having a Porous Structure

A platinum oxide layer having a dendritic structure was formed to a thickness of 1,000 nm on a mirror finished stainless steel (SUS 430, 30 mm×30 mm×t0.6 mm) by reactive sputtering. The loading amount of Pt at this time was 0.27 mg/cm$^2$. The reactive sputtering was performed under conditions of a total pressure of 4 Pa, an oxygen flow ratio ($Q_{O2}/(Q_{Ar}+Q_{O2})$) of 70%, a substrate temperature of 80° C., and an application power of 4.9 W/cm$^2$. Then, the platinum oxide having a dendritic structure was reduced at 120° C. for 30 minutes in a 2% $H_2$/He atmosphere (1 atm), whereby a substrate having a dendritic structure was obtained.

Then, 0.45 g of tetraisopropyltitanate, 20 g of n-butanol, and 0.5 g of acetic acid were mixed, and stirred for 8 hours. After that, the mixture was applied to the substrate by spin coating (3,500 rpm, 2 minutes). The coated substrate was allowed to stand in an environment of 25° C. and 80 RH % for 10 hours, and thereafter, sintered at 450° C. for 4 hours. Then, the resultant substrate was allowed to stand in an environment of 25° C. and 80 RH % for 8 hours.

Then, the substrate was soaked in 3-cyanopropyltriethoxysilane heated to 80° C. for 5 hours, and rinsed with ethanol, followed by drying. After that, the substrate was treated with 1N hydrochloric acid to convert the cyano group into a carboxyl group.

Substrate Material Example 2 Having a Porous Structure

A substrate was produced in the same way as in the substrate material example 1 except that the thickness of the platinum oxide layer was set to be 500 nm by changing the sputtering time.

Substrate Material Example 3 Having a Porous Structure

A substrate was produced in the same way as in the substrate material example 1 except that the thickness of the platinum oxide layer was set to be 250 nm by changing the sputtering time.

Substrate Material Example 4 Having a Porous Structure

A substrate was produced in the same way as in the substrate material example 1 except that the thickness of the platinum oxide layer was set to be 100 nm by changing the sputtering time.

Substrate Material Example 5 Having a Porous Structure

A substrate was produced by soaking a mirror finished stainless steel (SUS430, 30 mm×30 mm×t0.6 mm) in concentrated hydrochloric acid (37 wt %) for 5 minutes, and thereafter, washing sufficiently the stainless steel with distilled water.

Then, 0.45 g of tetraisopropyltitanate (Tokyo Chemical Industry Co., Ltd.), 20 g of n-butanol, and 0.5 g of acetic acid were mixed, and stirred for 8 hours. After that, the mixture was applied to the substrate by spin coating (3,500 rpm, 2 minutes). The coated substrate was allowed to stand in an environment of 25° C. and 80 RH % for 10 hours, and thereafter, sintered at 450° C. for 4 hours. Then, the resultant substrate was allowed to stand in an environment of 25° C. and 80 RH % for 8 hours.

Then, the above substrate was soaked in 3-cyanopropyltriethoxysilane heated to 80° C. for 5 hours, and rinsed with ethanol, followed by drying. After that, the substrate was treated with 1N hydrochloric acid to convert the cyano group into a carboxyl group.

Substrate Material Example 6 Having a Porous Structure

A platinum oxide layer having a dendritic structure was formed to a thickness of 1,000 nm on a mirror finished stainless steel (SUS 430, 30 mm×30 mm×t0.6 mm) by reactive sputtering. The loading amount of Pt at this time was 0.27 mg/cm$^2$. The reactive sputtering was performed under conditions of a total pressure of 4 Pa, an oxygen flow ratio ($Q_{O2}/(Q_{Ar}+Q_{O2})$) of 70%, a substrate temperature of 80° C., and an application power of 4.9 W/cm$^2$. Then, the platinum oxide having a dendritic structure was reduced at 120° C. for 30 minutes in a 2% $H_2$/He atmosphere (1 atm), whereby a substrate having a dendritic structure was obtained.

Then, 0.45 g of tetraisopropyltitanate (Tokyo Chemical Industry Co., Ltd.), 20 g of n-butanol, and 0.5 g of acetic acid were mixed, and stirred for 8 hours. After that, the mixture was applied to the substrate by spin coating (3,500 rpm, 2 minutes). The coated substrate was allowed to stand in an environment of 25° C. and 80 RH % for 10 hours, and thereafter, sintered at 450° C. for 4 hours. Then, the resultant substrate was allowed to stand in an environment of 25° C. and 80 RH % for 8 hours.

Then, the substrate was soaked in 3-mercaptopropyltriethoxysilane heated to 100° C. for 5 hours, and rinsed with ethanol, followed by drying. After that, the substrate was treated with 30% hydrogen peroxide solution to convert the SH group into a sulfonic acid group.

Substrate Material Example 7 Having a Porous Structure

A platinum oxide layer having a dendritic structure was formed to a thickness of 1,000 nm on a mirror finished stainless steel (SUS 430, 30 mm×30 mm×t0.6 mm) by reactive sputtering. The loading amount of Pt at this time was 0.27 mg/cm$^2$. The reactive sputtering was performed under conditions of a total pressure of 4 Pa, an oxygen flow ratio ($Q_{O2}/(Q_{Ar}+Q_{O2})$) of 70%, a substrate temperature of 80° C., and an application power of 4.9 W/cm$^2$. Then, the platinum oxide having a dendritic structure was reduced at 120° C. for 30 minutes in a 2% $H_2$/He atmosphere (1 atm), whereby a substrate having a dendritic structure was obtained.

Then, 0.45 g of tetraisopropyltitanate (Tokyo Chemical Industry Co., Ltd.), 20 g of n-butanol, and 0.5 g of acetic acid were mixed, and stirred for 8 hours. After that, the mixture was applied to the substrate by spin coating (3,500 rpm, 2 minutes). The coated substrate was allowed to stand in an environment of 25° C. and 80 RH % for 10 hours, and thereafter, sintered at 450° C. for 4 hours. Then, the resultant substrate was allowed to stand in an environment of 25° C. and 80 RH % for 8 hours.

Then, the substrate was soaked in (heptadecafluoro-1,1,2,2-tetrahydroxydecyl)triethoxysilane for 5 hours, and rinsed well with ethanol, followed by drying. After that, the substrate was subjected to UV-ray/ozone treatment, and allowed to stand in an environment of 25° C. and 80 RH % for 8 hours, whereby a carboxyl group was generated on the surface of the substrate.

Substrate Material Example 8 Having a Porous Structure

A platinum oxide layer having a dendritic structure was formed to a thickness of 1,000 nm on a mirror finished stainless steel (SUS 430, 30 mm×30 mm×t0.6 mm) by reactive sputtering. The loading amount of Pt at this time was 0.27 mg/cm$^2$. The reactive sputtering was performed under conditions of a total pressure of 4 Pa, an oxygen flow ratio ($Q_{O2}/(Q_{Ar}+Q_{O2})$) of 70%, a substrate temperature of 80° C., and an application power of 4.9 W/cm$^2$. Then, the platinum oxide having a dendritic structure was reduced at 120° C. for 30 minutes in a 2% $H_2$/He atmosphere (1 atm), whereby a substrate having a dendritic structure was obtained.

Then, 0.45 g of tetraisopropyltitanate (Tokyo Chemical Industry Co., Ltd.), 20 g of n-butanol, and 0.5 g of acetic acid were mixed, and stirred for 8 hours. After that, the mixture was applied to the substrate by spin coating (3,500 rpm, 2 minutes). The coated substrate was allowed to stand in an environment of 25° C. and 80 RH % for 10 hours, and thereafter, sintered at 450° C. for 4 hours. Then, the resultant substrate was allowed to stand in an environment of 25° C. and 80 RH % for 8 hours.

Then, the substrate was soaked in 3-aminopropyltriethoxysilane for 5 hours, and rinsed well with ethanol, followed by drying. Thereafter, the substrate was soaked in 37% concentrated hydrochloric acid, whereby the amino group on the surface was converted into an ammonium chloride group.

Substrate Material Example 9 Having a Porous Structure

A platinum oxide layer having a dendritic structure was formed to a thickness of 1,000 nm on a mirror finished stainless steel (SUS 430, 30 mm×30 mm×t0.6 mm) by reactive sputtering. The loading amount of Pt at this time was 0.27 mg/cm$^2$. The reactive sputtering was performed under conditions of a total pressure of 4 Pa, an oxygen flow ratio ($Q_{O2}/(Q_{Ar}+Q_{O2})$) of 70%, a substrate temperature of 80° C., and an application power of 4.9 W/cm$^2$. Then, the platinum oxide having a dendritic structure was reduced at 120° C. for 30 minutes in a 2% $H_2$/He atmosphere (1 atm), whereby a substrate having a dendritic structure was obtained.

Then, ruthenium chloride ($RuCl_3$) was dissolved and saturated in water at 80° C. for 3 hours, and the solution was filtered. The resultant solution was dripped onto the platinum substrate with a dendritic structure and dried. After that, the substrate was heated at 300° C. for 3 hours, and slowly cooled to room temperature. Again, the substrate was allowed to stand in a 25° C. and 80 RH % environment for 8 hours.

Then, the substrate was soaked in 3-cyanopropyltriethoxysilane heated to 80° C. for 5 hours, and rinsed with ethanol, followed by drying. After that, the substrate was treated with 1N hydrochloric acid to convert the cyano group into a carboxyl group.

Substrate Material Example 10 Having a Porous Structure

A substrate was produced in the same way as in substrate material example 9 having a porous structure, except that ruthenium chloride was changed to tungsten chloride.

Substrate Material Example 11 Having a Porous Structure

A platinum oxide layer having a dendritic structure was formed to a thickness of 1,000 nm on a mirror finished stainless steel (SUS 430, 30 mm×30 mm×t0.6 mm) by reactive sputtering. The loading amount of Pt at this time was 0.27 mg/cm$^2$. The reactive sputtering was performed under conditions of a total pressure of 4 Pa, an oxygen flow ratio ($Q_{O2}$/($Q_{Ar}$+$Q_{O2}$)) of 70%, a substrate temperature of 80° C., and an application power of 4.9 W/cm$^2$. Then, the platinum oxide having a dendritic structure was reduced at 120° C. for 30 minutes in a 2% $H_2$/He atmosphere (1 atm), whereby a substrate having a dendritic structure was obtained.

Then, nickel chloride was dissolved and saturated in water at 80° C. for 3 hours, and the solution was filtered. The resultant solution was dripped onto the platinum substrate with a dendritic structure and dried. After that, the substrate was heated at 500° C. for 3 hours, and slowly cooled to room temperature. Again, the substrate was allowed to stand in a 25° C. and 80 RH % environment for 8 hours.

Then, the substrate was soaked in 3-aminopropyltriethoxysilane heated to 80° C. for 5 hours, and rinsed with ethanol, followed by drying. After that, the substrate was treated with 1N hydrochloric acid to convert the amino group into an ammonium chloride group.

(Analyte Material)

In the measurement of mass spectrometry, used was a sample of the composition containing nine peptides (MassPREP Peptides Mixture, manufactured by Waters Corporation): RASG-1 (WATERS MASSPREP™ PEPTIDE STANDARD, molecular weight: Mw=1000.49), Angiotensin flag 1-7 (Mw=898.47), bradykinin (Mw=1059.56), Angiotensin I (Mw=1295.68), Angiotensin II (Mw=1045.53), Rennin substrate (Mw=1757.93), Enolase T35 (Mw=1871.96), Enolase T37 (Mw=2827.28), and Melittin (Mw=2845.74). The content of each peptide is about 1.0 nmol. Water was added to the peptide mixed sample to adjust each peptide concentration to about 10 μmol/L, and 1 μL of the peptide solution was dripped onto a substrate in the measurement of mass spectrometry, followed by drying. Thus, about 10 pmol of each peptide was contained in every spot of the measuring sample.

Example 1

The substrate produced in the substrate material example 1 was attached and fixed to a stainless target substrate for MALDI-TOF MS measurement cut by only 0.6 mm with a conductive double-sided tape. The peptide mixed solution was dripped in an amount of 1 μL onto the substrate, and dried.

Then, the substrate was attached to an MALDI-TOF MS apparatus (REFLEX-III (trade name), manufactured by Bruker Daltonics Inc.). The irradiation laser in the measurement of MALDI-TOF MS was a nitrogen laser (wavelength=337 nm), wherein a reflection mode (reflector mode) of positive ions was employed. The measurement was conducted with a irradiation laser intensity being larger by 2% than the intensity at which a peak of parent ions started to appear, a spectrum of 20 pulses at one spot was accumulated for 10 spots, and signal intensities obtained from laser irradiation of 200 pulses in total were added up to obtain a spectrum.

Further, the acceleration voltage was set to be 26.5 kV, and peaks of a mass number of 0 to 3,000 were taken. Cation species having flown to a detector with a cutoff value of 0 or more in a low molecular weight region in the measurement, i.e., without a cutoff, were taken in all the regions.

The obtained spectrum was evaluated based on the intensity of analyte molecules (molecular weight region for an adduct of protons of each peptide: the peaks appearing in the vicinity of 890 to 2,900 were regarded as those of parent ions), and the peak intensity and the variety of decomposed substances in a molecular weight region of 50 to 700. The relative intensities between peaks of parent ions and impurity peaks are comparatively evaluated in each spectrum, and parent ions with no intensity were set to be 0, and a ranking of 1 to 5 was set with an increase in intensity and variety. Table 1 shows the results of the evaluation.

(1) Evaluation of Parent Ions

5: parent ion intensity accounts for 80% or more of the total of peak intensities of a molecular weight of 1,000 or more 4: parent ion intensity accounts for 50% or more and less than 80% of the total of peak intensities of a molecular weight of 1,000 or more 3: parent ion intensity accounts for 30% or more and less than 50% of the total of peak intensities of a molecular weight of 1,000 or more 2: parent ion intensity accounts for 2% or more and less than 30% of the total of peak intensities of a molecular weight of 1,000 or more 1: parent ion intensity accounts for less than 2% of the total of peak intensities of a molecular weight of 1,000 or more (2) Evaluation of Decomposed Substances and Impurities 1: total of peaks of a molecular weight of 500 or less is 3% or less of the parent peak intensity.

2: total of peaks of a molecular weight of 500 or less is 3% or more and less than 20% of the parent peak intensity.

3: total of peaks of a molecular weight of 500 or less is 20% or more and less than 40% of the parent peak intensity.

4: total of peaks of a molecular weight of 500 or less is 40% or more and less than 60% of the parent peak intensity.

5: total of peaks of a molecular weight of 500 or less is 60% or more of the parent peak intensity.

Examples 2-7, and Examples 9 and 10

The evaluation was conducted in the same way as in Example 1, except for replacing the substrate material by those which were produced in substrate material examples 2 to 7.

Examples 8 and 11

The evaluation was conducted in the same way as in Example 1 except for replacing the substrate material by the one produced in the substrate material example 8, and setting the measurement mode to be negative ions.

Comparative Example 1

The evaluation was conducted in the same way as in Example 1 except for using a mirror finished stainless steel (SUS430, 30 mm×30 mm×t0.6 mm) in place of the substrate material example 1.

Comparative Example 2

In Example 1, the measurement was conducted in the same way as in Example 1 except for substituting a commercially available substrate for mass spectrometry (porous silicon, MassPREP™ DIOS-target plate, manufactured by Nihon Waters K.K.) cut to 20 mm×20 mm.

Comparative Example 3

The evaluation was conducted in the same way as in Example 1, except for attaching and fixing a mirror finished stainless steel (SUS430, 30 mm×30 mm×t0.6 mm) to the stainless target substrate for MALDI-TOF MS measurement cut by 0.6 mm with a conductive double-sided tape, dripping 2 μL of a tetrahydrofuran solution (5 wt %) of 1,8,9-trihydroxyanthracene as a matrix with a micropipette, and further dripping 1 μL of a solution of the peptide mixture with a micropipette, followed by drying.

TABLE 1

| | Substrate | Oxide layer | Surface functional group | Evaluation of parent ions | Evaluation of decomposed substances and impurities |
|---|---|---|---|---|---|
| Example 1 | Dendritic platinum | $TiO_2$ | Carboxyl group | 4 | 2 |
| Example 2 | Dendritic platinum | $TiO_2$ | Carboxyl group | 4 | 2 |
| Example 3 | Dendritic platinum | $TiO_2$ | Carboxyl group | 4 | 2 |
| Example 4 | Dendritic platinum | $TiO_2$ | Carboxyl group | 4 | 2 |
| Example 5 | Porous stainless | $TiO_2$ | Carboxyl group | 4 | 2 |
| Example 6 | Dendritic platinum | $TiO_2$ | Sulfonic group | 5 | 1 |
| Example 7 | Dendritic platinum | $TiO_2$ | Carboxyl group | 5 | 1 |
| Example 8 | Dendritic platinum | $TiO_2$ | Ammonium chloride group | 3 | 2 |
| Example 9 | Dendritic platinum | $RuO_2$ | Carboxyl group | 5 | 2 |
| Example 10 | Dendritic platinum | $WO_3$ | Carboxyl group | 5 | 1 |
| Example 11 | Dendritic platinum | $NiO_2$ | Ammonium chloride group | 4 | 1 |
| Comparative Example 1 | Mirror finished stainless | None | None | 1 | 4 |
| Comparative Example 2 | Porous silicon | None | None | 1 | 4 |
| Comparative Example 3 | Mirror finished stainless | None | (Matrix used) | 5 | 5 |

It was confirmed from the above examples and comparative examples that impurity peaks derived from a decomposed substance of measuring molecules and from a matrix in a lower molecular weight region are suppressed and a parent peak can be obtained at high intensity by using the substrate for mass spectrometry of the present invention. Further, even in the measurement using a matrix, the enhancement of parent ions and the reduction of peaks derived from a decomposed substance and from a matrix can be confirmed.

The substrate for mass spectrometry of the present invention enables the detection of a high molecular weight compound by desorption/ionization to be performed at a high sensitivity and can avoid fragmentation, so that there is substantially no obstacle to the analysis of a low molecular weight region in the mass spectrometry of desorption/ionization by laser irradiation, so the substrate can be used in a mass spectrometer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-161803, filed Jun. 19, 2007, which is hereby incorporated by reference herein in its entirety.

What is claimed is:

1. A substrate for mass spectrometry for use in laser desorption/ionization mass spectrometry, containing a metal and having a porous structure on a surface thereof, wherein at least one functional group selected from the group consisting of a carboxyl group, a sulfonic group and an ammonium chloride group is covalently bonded to the surface of the substrate.

2. A substrate for mass spectrometry according to claim 1, wherein an oxide layer is formed on the surface of the substrate containing a metal and having a porous structure, and wherein at least one functional group selected from the group consisting of a carboxyl group, a sulfonic group and an ammonium chloride group is covalently bonded to the oxide layer.

3. A substrate for mass spectrometry according to claim 2, wherein the oxide layer is formed of one of $TiO_2$, $RuO_2$, $NiO_2$, and $WO_3$.

4. A substrate for mass spectrometry according to claim 1, wherein the porous structure is formed by providing pores in a substrate.

5. A substrate for mass spectrometry according to claim 1, wherein the porous structure is of a projected structure formed by forming a projected portion on a surface of a substrate.

6. A substrate for mass spectrometry according to claim 5, wherein the porous structure is of a dendritic structure formed of one of platinum obtained by subjecting a platinum oxide to reduction treatment and a multi-element metal containing platinum obtained by subjecting a complex oxide to reduction treatment.

7. A substrate for mass spectrometry according to claim 6, wherein a metal element in the multi-element metal other than the platinum comprises at least one metal selected from the group consisting of Al, Si, Ti, V, Cr, Fe, Co, Ni, Cu, Zn, Ge, Zr, Nb, Mo, Ru, Rh, Pd, Ag, In, Sn, Hf, Ta, W, Os, Ir, Au, La, Ce, and Nd.

8. A substrate for mass spectrometry according to claim 5, wherein a proportion of a length of the projected portion of the porous structure in a direction parallel to the surface of the substrate within a range of 20 nm to 200 nm is 70% or more.

9. A substrate for mass spectrometry according to claim 1, wherein the porous structure has a thickness of 30 nm to 1,000 nm.

10. A mass spectrometry method, comprising:

placing a sample on the substrate for mass spectrometry according to claim 1; and irradiating the substrate with a laser.

11. A mass spectrometer comprising the substrate for mass spectrometry according to claim 1.

* * * * *